N. IVERSON.
STRAINER.
APPLICATION FILED APR. 29, 1914.

1,177,953.

Patented Apr. 4, 1916.

Witnesses:
Frederick R. Moran,
P. H. Holter

Inventor
Nis Iverson,
By Victor J. Evans
Attorney

UNITED STATES PATENT OFFICE.

NIS IVERSON, OF BRIDGEPORT, CONNECTICUT.

STRAINER.

1,177,953.  Specification of Letters Patent.  Patented Apr. 4, 1916.

Application filed April 29, 1914. Serial No. 835,216.

*To all whom it may concern:*

Be it known that I, NIS IVERSON, a citizen of the United States, residing at Bridgeport, in the county of Fairfield and State of Connecticut, have invented new and useful Improvements in Strainers, of which the following is a specification.

An object of the invention is to provide a simple strainer for use on tea or coffee pots and the like, and which can be quickly applied to a pot or other receptacle to effectively strain the fluid as the same is poured through the spout thereof.

The invention contemplates, among other features, the provision of a strainer which is adapted to be arranged to depend inside of the pot and cover the entrance to the spout, with means for holding the strainer in position, thus obviating the necessity of the person pouring the contents of the pot therefrom from holding the strainer in position over a cup or other receptacle adapted to receive the poured fluid.

Figure 1:
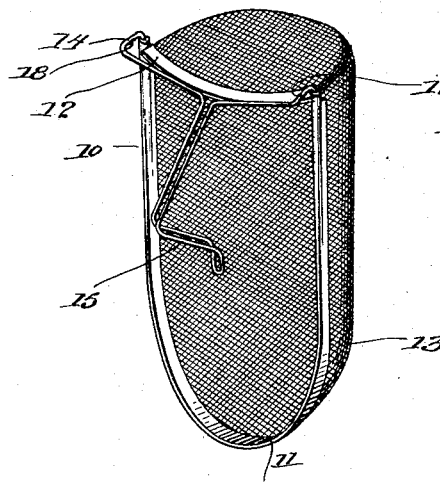
Figure 2:
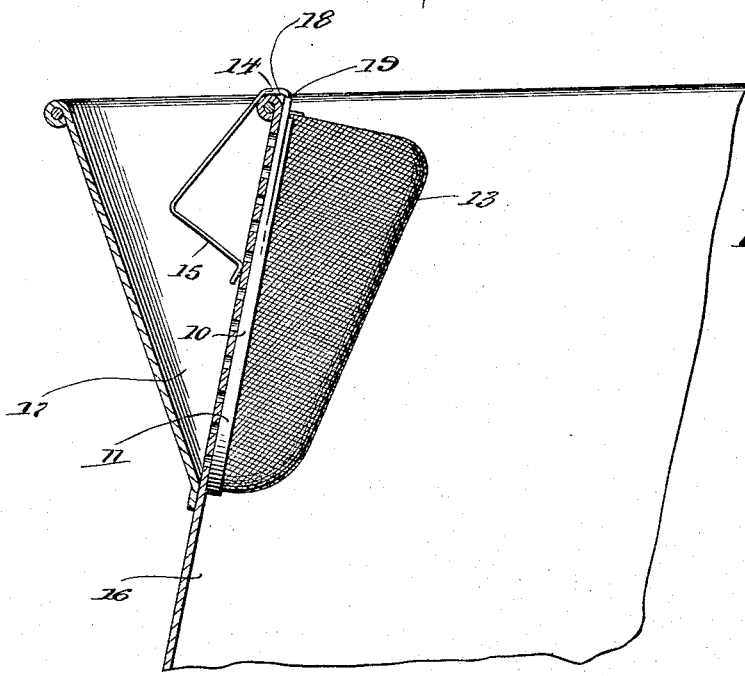
Figure 3:
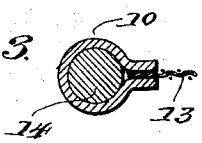

In the further disclosure of the invention reference is to be had to the accompanying drawings, constituting a part of this specification, in which similar characters of reference denote corresponding parts in all the views, and in which:

Figure 1 is a perspective view of the article; Fig. 2 is a sectional view taken through a pot showing the strainer applied thereto; and Fig. 3 is a fragmentary enlarged sectional view taken through a part of the strainer to show the arrangement of the holding device.

Referring more particularly to the views, I provide a strainer body 10 which preferably consists of a substantially U-shaped band-like frame 11 including a cross piece 12 connecting the free ends of the U-shaped frame 11, said frame, as mentioned, being preferably made of a flat or band-like piece of material and bent upon itself so that the edges of a fine mesh screen 13 can be secured upon the frame 11 and cross piece 12, the said screen 13 being preferably bulged as shown.

A holder is provided for the strainer body 10 and consists of a single piece of wire 14 bent at its medial portion to form an exterior gripping member 15 which, on account of the inherent spring-like action of the material from which the holder is made, will grip the exterior of the coffee pot 16 having the usual spout 17, the said gripping member 15 being adapted to lie within the plane of the spout. The free ends of the wire 14 are adapted to extend into the U-shaped frame 11 adjacent the ends of the cross piece 12 and which part of the frame is preferably tubular as shown, the said holder being held frictionally on the frame by the spring-like action of the holder and which is bent at its medial portion to form the gripping member 15, as mentioned. Thus, as clearly set forth, the strainer body 10 is adapted to lie within the pot and cover the entrance to the spout, whereas the gripping member 15 of the holder lies exteriorly of the pot and engages the outer wall thereof, with the said gripping member lying in the plane of the spout and extending therein. The holder includes offset portions 18 which project over the upper edge 19 of the pot, and it will be apparent that by pressing the offset portions slightly toward each other the frictional engagement of the free ends of the wire 14 forming the holder, with the frame of the strainer body, will be minimized so that the strainer body can be adjusted on the holder. This construction is provided inasmuch as the entrance to the spout of one coffee pot may be a greater distance from the top edge of the pot than the entrance to the spout of another coffee pot. With a construction such as set forth, however, the strainer body can be adjusted relatively to the holder so as to compensate for any differences in the location of the spout relatively to the pot.

The device described can be cheaply manufactured and will effectively perform the desired result, while at the same time, it being held upon the coffee pot, will obviate the necessity of the user holding the pot in one hand and the strainer in the other. Furthermore, the strainer possesses an advantage in being placed inside of the pot rather than exteriorly of the spout in that no drippings from the strainer will fall upon the table cloth.

Having thus described my invention, I claim:

A device of the class described consisting of a U-shaped frame, made of bandlike material, said frame being bent upon itself substantially throughout its length, a mesh screen having two longitudinal edges received in the sides of said frame, and a curved edge secured in the lower curved part of the frame, said screen curving around at its rear portion and having a substantially flat top portion, integral tubular portions formed upon the ends of said frame, a cross piece connected tangentially to the tubular portions of said frame and in which projects the flat top portion of the screen, said cross piece projecting in advance of said tubular portions and having a convex edge, and a wire gripping member having its free ends adapted to fit in said tubular portions, said member depending forwardly of said tubular portions and bent around toward the center of the screen and having formed thereon a resilient gripping member exerting pressure in the direction of said frame when under tension.

In testimony whereof I affix my signature in presence of two witnesses.

NIS IVERSON.

Witnesses:
 HUGH J. LAURY,
 DAVID BROLLEY.

Copies of this patent may be obtained for five cents each, by addressing the "Commissioner of Patents, Washington, D. C."